United States Patent
Chen et al.

(10) Patent No.: US 9,512,502 B2
(45) Date of Patent: *Dec. 6, 2016

(54) METHOD FOR PRODUCING A HIGH-PURITY NANOMETER ZINC OXIDE FROM LOW-GRADE ZINC OXIDE ORE BY AMMONIA DECARBURIZATION

(71) Applicant: SICHUAN XINHONG TECHNOLOGY CO., LTD, Chengdu, Sichuan (CN)

(72) Inventors: Shangquan Chen, Chengdu (CN); Shichun Li, Chengdu (CN); Xiaohong Li, Chengdu (CN)

(73) Assignee: SICHUAN XINHONG TECHNOLOGY CO., LTD, Chengdu (CN)

( * ) Notice: Subject to any disclaimer, the term of this patent is extended or adjusted under 35 U.S.C. 154(b) by 46 days.

This patent is subject to a terminal disclaimer.

(21) Appl. No.: 14/430,547

(22) PCT Filed: Sep. 25, 2012

(86) PCT No.: PCT/CN2012/081875
§ 371 (c)(1),
(2) Date: Mar. 23, 2015

(87) PCT Pub. No.: WO2014/047762
PCT Pub. Date: Apr. 3, 2014

(65) Prior Publication Data
US 2015/0240327 A1    Aug. 27, 2015

(51) Int. Cl.
| | |
|---|---|
| *C22B 19/34* | (2006.01) |
| *B82Y 40/00* | (2011.01) |
| *C01G 9/02* | (2006.01) |
| *C22B 19/02* | (2006.01) |
| *C22B 3/00* | (2006.01) |
| *C22B 3/14* | (2006.01) |
| *C22B 3/44* | (2006.01) |

(52) U.S. Cl.
CPC ............... *C22B 19/34* (2013.01); *B82Y 40/00* (2013.01); *C01G 9/02* (2013.01); *C22B 3/14* (2013.01); *C22B 3/44* (2013.01); *C22B 19/02* (2013.01); *C22B 19/24* (2013.01); *C01P 2004/64* (2013.01); *C01P 2006/12* (2013.01); *C01P 2006/80* (2013.01); *Y02P 10/234* (2015.11)

(58) Field of Classification Search
CPC .... C01G 9/02; C01P 2006/12; C01P 2006/80; B82Y 40/00
See application file for complete search history.

(56) References Cited

FOREIGN PATENT DOCUMENTS

| CN | 1065685 A | 10/1992 |
|---|---|---|
| CN | 1477217 A | 2/2004 |
| CN | 1986421 A | 6/2007 |
| CN | 102515252 A | 6/2012 |

*Primary Examiner* — Richard M Rump

(57) ABSTRACT

Disclosed is a method for producing a nanometer zinc oxide from low-grade zinc oxide ore by ammonia decarburization. The method comprises: taking ammonia water-ammonium bicarbonate solution as a leaching agent; adding 0.3-0.5 kg sodium fluorosilicate to per cubic meter of the leaching agent; leaching low-grade zinc oxide ore with the leaching agent; and adding 50-60 kg slaked lime to per cubic meter of leached solution to carry out decarburization treatment. The obtained nanometer zinc oxide powder has purity of 99.7% or up, uniform particle size distribution (average particle size of 10-28 nm), specific surface area of 107 $m^2/g$ or up, good fluidity and good dispersity. The treatment method of the present invention is low in energy consumption and high in efficiency, and the leaching agent can be recycled. The final leached residue subject to the leaching treatment, without destruction of original mineral component phase composition, can still be used for brick making, so as to achieve dual purposes of economy and environment protection, and has a high economic value and social value.

9 Claims, No Drawings

METHOD FOR PRODUCING A HIGH-PURITY NANOMETER ZINC OXIDE FROM LOW-GRADE ZINC OXIDE ORE BY AMMONIA DECARBURIZATION

CROSS REFERENCE OF RELATED APPLICATION

This is a national phase application of an international patent application number PCT/CN2012/081875 with a filing date of Sep. 25, 2012. The contents of these specifications, including any intervening amendments thereto, are incorporated herein by reference.

BACKGROUND OF THE PRESENT INVENTION

Field of Invention

The present invention relates to a method for producing zinc oxide, and more particularly to a method for producing high-purity nanometer zinc oxide.

Description of Related Arts

At present, the raw material for producing zinc oxide product usually is zinc calcine which calcined by ore with high content of zinc. The content of zinc is higher, so it is easy for leaching relatively. With years of mining, high-grade ore source has become less and less, and the grade of ore is gradually reduced, people now begin to pay attention to the use of zinc oxide ore. But the content of zinc in zinc oxide ore is usually low (content of valuable elements: Zn below 30%; Pb 0.15%; Cu 0.008%; Mn 0.06%), and its composition is complicated, it exist in the form of smithsonite, zinc ferrites ore or hemimorphite, and with high content components of iron oxide, silicon oxide, calcium oxide and magnesium oxide (respectively $Fe_2O_3$ 4-7%; $SiO_2$ 3-5%; CaO 30-32%; MgO 7-8%), mud content is high. The value of comprehensive recovery and utilization is little. Ore dressing and acid leaching of zinc are more difficult, the Ore dressing cost is high, it is the major technical problems in the filed of Ore dressing at home and abroad long existing. In recent years, the leaching method for zinc oxide ore is leaching zinc oxide by zinc sulfate solution containing strong acid, although the zinc leached rate has improved, but the content of iron and silicon entering into solution is also high, iron removal is difficult, reagent consumption amount is large, the washing liquid take away many zinc. China public patent such as CN1477217A has improved the above method. Firstly, perform neutral leaching adopting the solution containing zinc sulfate and pH=3-4, and then perform low acid leaching process. But the zinc ferrites ore and hemimorphite decompose slowly at low acid conditions, and it still exist the issues of low leaching efficiency, high cost, environmental pollution and other issues. Many metallurgical workers at home and abroad all consider that the zinc content of less than 20% Zinc Oxide mine should not be used alone to deal with wet leaching process.

The most ideal processing method for the low-grade zinc oxide ore is the selective leaching of zinc, it make the zinc entering into the final leached solution, and recycle zinc valuably.

High-purity zinc oxide usually refers to the zinc oxide product with the mass percent ≥99.7%. The high-purity zinc oxide is an indispensable raw material for the modern high technologies, with wide applications. It is mainly used in glass, feed, ceramics, dyes, paint, paper-making, rubber, pesticides, oil refining, galvanization, special steel, alloy, defence-related science and technology, etc. The glass, paper-making, or rubber, oil refining enterprises have high demands for zinc oxide and very high purity requirement.

Nanometer zinc oxide (ZnO) is a new type of high-function fine inorganic product with the particle size between 1 and 100 nm in the $21^{st}$ century, exhibiting a variety of special properties such as non-migratory, fluorescence, piezoelectric, absorption and UV scattering ability, etc. With its special optical, electrical, magnetic and sensitivity performance, it can be used to produce gas sensors, phosphors, rheostat, UV shielding materials, image recording materials, piezoelectric materials, varistors, efficient catalysts, magnetic materials, and plastic films, etc.

Currently the methods producing zinc oxide mainly include chemical precipitation method, sol-gel method, microemulsion method and hydrothermal synthesis method, etc. But all raw materials used are zinc calcine or pure zinc salts (such as zinc sulfate, zinc nitrate or zinc acetate) with the zinc content higher than 50%.

Ammonia method is a commonly used method for producing zinc oxide. Currently, the ammonia method (ammonia-ammonium bicarbonate combined leaching method) for producing zinc oxide generally includes the following steps: leaching of zinc-containing materials using ammonia-ammonium bicarbonate as leaching agent, and after purification, ammonia evaporation crystallization, drying, calcinations of zinc-ammine complexing solution, produce the zinc oxide product.

Above-mentioned traditional ammonia method for producing zinc oxide has not been used in low-grade zinc oxide ore, mainly due to the following reasons:

1. Those ore have low zinc content and high mud content, the leached solution has low zinc concentration and high cost, so enterprises can not afford;
2. Because of complicated impurities, qualified rate of products is low, product prices are low and economic benefit is difference;
3. Conventional means of leaching, leached rate of zinc ore is low, residual zinc in leached residue is high, so it is high waste, zinc ore value not use and reflect.

Currently, the disclosed technologies of producing nanometer zinc oxide by ammonia leaching method are low-temperature hydrolysis methods, for example:

Chinese Patent Application No. 92103230.7 discloses an improved technology for producing zinc oxide aiming at traditional ammonia complexometry. The purified zinc-ammonia complexing solution is diluted with water to hydrolyze part of zinc-ammonia complexing solution and obtain the basic zinc carbonate (with a ratio of zinc hydroxide and zinc carbonate of 2:1), and then continue to heat until zinc-ammonia complexing solution is decomposed completely. After high-temperature calcinations, 30-100 nn nanometer zinc oxide is obtained.

For the patented technology, the following problems need to be solved:

After hydrolysis, in the thermal decomposition process of undissociated zinc-ammonia complexing solution, the newly generated basic zinc carbonate will continue to grow on the original surface of crystal nucleus, promoting the growing of originally hydrolyzed crystal, which is prone to cause uneven zinc carbonate crystal, making it difficult to control the particle size of the final product.

It adds 4-10 times of water, reducing the efficiency in the preparation process, increasing the energy consumption and the water treatment cost at the back end.

Chinese Patent Application No. 200610130477.7 disclosed an improved technology producing zinc oxide for the traditional ammonia complex method. The zinc-ammonia complexing solution is mixed with 1:2-20 hot water or hot mother liquor continuously. After heating and heat preservation, it is recycled to be used in hydrolysis of zinc-ammonia complexing solution, to prepare 10-50 nn of nanometer zinc oxide.

For the patented technology, the following problems need to be solved:

After hydrolysis of mother liquor, the ammonia cannot be fully separated, and it cannot achieve the hydrolysis effect, and finally the zinc-ammonia complexing solution is mixed with the zinc-ammonia complexing solution.

For the above two patents, the nanometer crystals are obtained by slightly changing pH value with a large amount of water. In fact, relying solely on the pH value slight change, only a very small part of hydrolysis can be achieved (checked from the ammonium hydroxide solubility curve of zinc oxide). The higher concentration of zinc ammonia liquid, the higher the precipitation efficiency and lower energy consumption; while the lower concentration of zinc ammonia liquid, the lower the precipitation efficiency and high energy consumption. It is technically feasible by artificially increasing the proportion of water to produce nanometer zinc oxide, but it is not feasible in terms of economic efficiency.

In addition, for the current ammonia leaching method for producing zinc oxide, the crystal is basic zinc carbonate, with high decomposition temperature (the initial temperature of zinc hydroxide decomposition is about 125° C., and that of zinc carbonate is about 300° C.). In order to obtain high-purity products, it is necessary to guarantee a high decomposition temperature, generally controlled at above 500° C., to completely decompose the basic zinc carbonate. For example, in the Chinese Patent with Application No. 200610130477.7, the calcinations temperature is as high as 550° C. High-temperature calcinations seriously affect the specific surface area and dispersity of zinc oxide, and thereby affecting its application field.

In summary, for treatment process of the low-grade zinc oxide ore, how to effectively leach the zinc from materials with low zinc content and get high-purity nanometer zinc oxide and to overcome the disadvantages of traditional pyrometallurgy and hydrometallurgy have become technical problems urgently to be resolved in the industry.

SUMMARY OF THE INVENTION

An objective of the present invention is to provide an effective method for recycling the zinc from low-grade zinc oxide ore and producing high-purity nanometer zinc oxide.

In order to achieve the above objectives, the present invention is embodied by the follow technical solution: A method for producing a nanometer zinc oxide from low-grade zinc oxide ore by ammonia decarburization, comprising the following steps:

The low-grade zinc oxide ore undergoes leaching, purification for impurity removal, crystallization by ammonia evaporation, drying and calcinations, wherein, Take ammonia water-ammonium bicarbonate solution as a leaching agent in said leaching step, in said ammonia water-ammonium bicarbonate solution, the molar concentration $c(NH_3)$=5.5-7 mol/L, the molar concentration $c(CO_3^{2-})$=0.95-1.2 mol/L, and adding 0.3-0.5 kg sodium fluorosilicate to per cubic meter of said leaching agent, obtain leached solution after leaching;

Adjust zinc oxide of said leached solution to 50-60 g/L, and then perform heating to reduce ammonia and decarburize and natural precipitation, the procedures are: add 30-60 kg slaked lime to per cubic meter of leached solution and stir, heating to 90-98° C. indirectly and slowly, until $c(CO_3^{2-}) \leq 0.3$ mol/L, $c(NH_3) \leq 3.5$ mol/L, and then add ammonium persulfate with the amount of 3-4 kg/m$^3$, add slaked lime powder with the amount of 5-10 kg/m$^3$ additionally, continue stir for decarburization and carrying out oxidation reaction, detect, when the concentration of $CO_3^{2-}$ is $c(CO_3^{2-}) \leq 0.1$ mol/L, remove all iron and manganese, and then perform solid-liquid separation;

Perform refining treatment after purification for impurity removal, the procedure of said refining treatment is: add ammonium phosphate and surfactant to the solution of after purification for impurity removal, the amount of ammonium phosphate is 1-3 kg per cubic meter of solution of said after purification for impurity removal, and the amount of surfactant (such as SDS) is 10-50 g per cubic meter of solution of said after purification for impurity removal.

Zinc oxide concentration of said leached solution is controlled to 50-60 g/L, the reason is that, after decarburization negative charge coordination ions depend entirely on $OH^-$ or $SO_4^{2-}$, and the solubility of zinc oxide at this temperature in 3-5 mol/L of ammonia water is 50-60 g/L (checking from solubility diagram of zinc oxide in ammonia water);

The procedures for purification for impurity removal, ammonia evaporation crystallization, drying and calcinations adopt the process parameters of common ammonia method for producing zinc oxide.

In the present invention, the existing zinc oxide producing technology is applied to the treatment of low-grade zinc oxide ore. Meanwhile, under the basis of existing ammonia method, add appropriate amount of sodium fluorosilicate into leaching agent. Before the purification step, add the steps of adding slaked lime to the leached solution for stirring and decarburization.

Since the low-grade zinc oxide ore contains a large amount of calcium oxide and magnesium oxide as gangue composition, which can not be leached out by acid method, thus, in the present invention, ammonia method is adopted for leaching. Ultrafine particle in ore gangue plays an isolating effect for the leaching agent. To resolve this problem, through a lot of experiments, the inventor of the present invention concluded that, appropriate amount of sodium fluorosilicate can get rid of the packing effect of ultrafine particles on the leaching material, to realize the stratification and floating of ultrafine particles, and it makes particles containing zinc is completely immersed in the leaching agent.

During the decarburization and ammonia reduction step, ammonium persulfate is added as the oxidant.

By adding the step of decarburization and ammonia reduction, and adding slaked lime, it can on one hand, eliminate the excess of free ammonia, reduce the complexing ability of impurity ion, to remove the impurity ions, enhance the purification quality and reduce the dosage of purified reagents; and on the other hand, it can remove the carbonate ion in the solution, to get the nanometer precursor zinc hydroxide precipitate with a smaller size of crystal nucleus and low decomposition temperature in the subsequent deamination hydrolysis process.

Secondly, to get zinc oxide of nanometer scale, it needs to inhibit the growth of crystal particle. The particle size and distribution range of nanometer zinc oxide obtained by the existing ammonia method is unsatisfactory, which mainly contributes to the growing of crystals in the process of treatment, particularly the treatment on the raw material such as low-grade zinc oxide ore with low content of zinc.

To resolve the above problems, through a lot of experiments, the inventor of the present invention concluded that add appropriate amount of surfactant to the solution of being performed Purification for impurity removal, to effectively inhibit the growth of crystal in combination with the high-speed stirring in the process of ammonia precipitation and crystallization.

The chemical reaction equations in the leaching step are as follows:

$$ZnO + nNH_3 + H_2O \rightarrow [Zn(NH_3)_n]^{2+} + 2OH^-$$

$$ZnFe_2O_4 + nNH_3 + 4H_2O \rightarrow [Zn(NH_3)_n]^{2+} + 2Fe(OH)_3\downarrow + 2OH^-$$

$$ZnFe_2O_4 + nNH_3 + H_2O \rightarrow [Zn(NH_3)_n]^{2+} + Fe_2O_3\downarrow + 2OH^-$$

$$Zn_2SiO_4 + 2nNH_3 \rightarrow 2[Zn(NH_3)_n]^{2+} + SiO_4^{4-}$$

$$ZnSiO_3 + nNH_3 + 2NH_4HCO_3 \rightarrow [Zn(NH_3)_n]CO_3 + SiO_2 \cdot H_2O + (NH_4)_2CO_3$$

$$Zn(OH)_2 + nNH_3 \rightarrow [Zn(NH_3)_n]^{2+} + 2OH^-$$

$$ZnCO_3 + nNH_3 \rightarrow [Zn(NH_3)_n]CO_3$$

Wherein, n=1~4;

The chemical reactions in the decarburization step are as follows:

$$Ca(OH)_2 = Ca^{2+} + 2OH^-$$

$$Ca^{2+} + CO_3^{2-} \rightarrow CaCO_3\downarrow$$

$$NH_3 \cdot H_2O + NH_4HCO_3 \rightarrow 2NH_3\uparrow + CO_2\uparrow + 2H_2O;$$

The reactions in the purification to remove impurity step:

$$S_2O_8^{2-} + Mn^{2+} + 2NH_3H_2O + H_2O \rightarrow MnO(OH)_2\downarrow + 2NH_4^+ + 2SO_4^{2-} + 2H^+$$

$$S_2O_8^{2-} + 2Fe^{2+} + 6H_2O \rightarrow 2SO_4^{2-} + 2Fe(OH)_3\downarrow + 6H^+$$

$$AsO_4^{3-} + Fe^{3+} \rightarrow FeAsO_4\downarrow$$

$$AsO_3^{3-} + S_2O_8^{2-} + H_2O \rightarrow 2SO_4^{2-} - AsO_4^{3-} + 2H^+$$

$$2H_3AsO_3 + 8Fe(OH)_3 \rightarrow (Fe_2O_3)_4As_2O_3 \cdot 5H_2O\downarrow + 10H_2O$$

$$M^{2+} + S^{2-} \rightarrow MS\downarrow,$$

wherein, M represents $Cu^{2+}$, $Pb^{2+}$, $Cd^{2+}$, $Ni^{2+}$, $Hg^{2+}$ and other ions $$As^{3+} + S^{2-} \rightarrow As_2S_3\downarrow$$

$$Y^{2+} + Zn \rightarrow Zn^{2+} + Y,$$

wherein, Y represents $Cu^{2+}$, $Pb^{2+}$, $Cd^{2+}$, $Ni^{2+}$ and other ions;

Reaction equations in the ammonia evaporation step:

$$[Zn(NH_3)_i]^{2+} + 2OH^- = Zn(OH)_2\downarrow + iNH_3\uparrow$$

$$[Zn(NH_3)_i]^{2+} + SO_4^{2-} + 2NH_3 \cdot H_2O = Zn(OH)_2\downarrow + iNH_3\uparrow + (NH_4)_2SO_4,$$

wherein, i=1~4

Chemical reaction equation in the drying and calcinations step:

$$Zn(OH)_2 \rightarrow ZnO + H_2O\uparrow.$$

Preferably, add surfactant additionally with the amount of 0.03 kg~0.05 kg per cubic meter of said ammonia water-ammonium bicarbonate solution. The surfactants can be selected from SDS, etc. The surfactants can reduce the surface energy, and when combined with sodium fluorosilicate, it can get rid of the coating effect of ultrafine particles, increasing the penetration ability of the leaching agent and enhancing the recovery rate of zinc.

Further, add dicyandiamide additionally with the amount of 0.5 kg~1 kg per cubic meter of said ammonia water-ammonium bicarbonate solution. Dicyandiamide, as an ammonia stabilizer, can reduce the volatilization of ammonia in the leaching process, improve the working environment of leaching and reduce the loss of ammonia.

Preferably, wet ball-milling leaching is adopted when leaching simultaneously.

When wet ball-milling leaching mode is adopted, it can enhance the leaching efficiency because it can damage crystal structure of original ore and activation and leaching are performed simultaneously.

Preferably, after leaching step and before decarburization step, pre-evaporation ammonia is performed: heat the leached solution to 90-98° C. for ammonia evaporation, and add ammonium persulfate additionally with the amount of 2-4 kg per cubic meter of leached solution, evaporate the solution until the ammonia concentration is 2.5-3.5 mol/L. In the step of crystallization by ammonia evaporation, the temperature is controlled at 105° C. The stirring speed in the ammonia evaporation equipment is 600-900 rpm.

Preferably, after decarburization step, add ammonium fluoride to the solution with the amount of 1.5-2.0 times of the theoretical value of $Ca^{2+}$ in the solution.

Preferably, detect the zinc content of liquid in the ammonia evaporation equipment at any time in the said crystallization by ammonia evaporation step. When the zinc content is 1-1.5%, add NaOH solution to the ammonia evaporation equipment with the adding amount of 3-5 L/m³, and the concentration of said NaOH solution is 30% calculating by mass percent. When the mass percent of zinc is ≤0.3%, the ammonia evaporation step is finished; at this time, the solution contains a large amount of $SO_4^{2-}$ to form stable salt. It is meaningless to continue ammonia evaporation. Moreover, it will produce ammonium zinc sulfate precipitation, affecting the quality of nanometer zinc oxide product. In the late stage of ammonia evaporation, when the zinc concentration in the complexing solution is low, add NaOH to increase the pH value of the solution, which can convert $NH_4^+$ to $NH_3$, to achieve the effect of quickly evaporating ammonia and crystallizing, forming nanometer zinc hydroxide crystal nucleus.

Preferably, said low-grade zinc oxide ore is one kind of smithsonite, zinc ferrites ore or hemimorphite with the zinc mass percent of 8%~30%, or mixed ore of those with the zinc mass percent of 8%~30%.

The method of the present invention can be applied to a variety of low-grade zinc oxide ore; it has wide scope of application.

Preferably, said calcinations temperature is 150-280° C.

The main innovation points of the present invention are as follows: (1) add the decarburization step, to control the concentration of free $NH_3$, remove $CO_3^{2-}$ to achieve the purposes of rapid hydrolysis for precipitation of $Zn(OH)_2$; (2) In the step of ammonia evaporation, when the ammonia concentration of zinc-ammonia complexing solution is low, add NaOH to increase the PH value of the solution, convert $NH_4^+$ to $NH_3$ to realize the rapid ammonia precipitation; (3) add a surfactant (e.g. SDS) to the zinc-ammonia complexing solution to form crystal nucleus coating film and effectively control the growth of the nanometer zinc oxide crystal nucleus; (4) realize high-speed stirring through the steam power, to control the crystal nucleus of nanometer zinc oxide.

Since zinc hydroxide is obtained in the ammonia evaporation process in the present invention, the decomposition temperature and particle size of zinc hydroxide crystal nucleus are less than basic zinc carbonate crystal nucleus, when the calcinations temperature is 150-280° C., the nanometer zinc oxide power with excellent fluidity and dispersity (purity ≥99.7%, uniform particle size (average particle size of 10-28 nm), specific surface area ≥107 m$^2$/g) can be obtained. In addition, the treatment method of the present invention is low in energy consumption and high in efficiency, and the leaching agent can be recycled. The final leached residue subject to the leaching treatment, without destruction of original mineral component phase composition, can still be used for brick making, so as to achieve dual purposes of economy and environment protection, and has a high economic value and social value.

DETAILED DESCRIPTION OF THE PREFERRED EMBODIMENT

The present invention is further described in details with the embodiments. One skilled in the art will understand that the embodiment of the present invention as shown in the drawings and described above is exemplary only and not intended to be limiting.

Embodiment 1

Raw material: 1$^\#$ zinc oxide ore from Yunnan, the ingredients: Zn of 15.48%, Fe of 18.20%, SiO of 27.94%, the phase composition of zinc is zinc carbonate of 9.49%, zinc silicate of 2.12%, zinc sulfide of 0.73%, zinc ferrites ore of 3.14%.

The method for producing high-purity zinc oxide:

(1) Leaching: take 500 g of said 1$^\#$ zinc oxide ore, prepare 1500 ml ammonia water-ammonium bicarbonate solution as leaching agent, of which, the concentration of NH$_3$ is 5.5 mol/L and the concentration of CO$_3^{2-}$ is 1.2 mol/L. Add 0.3 kg sodium fluorosilicate to per cubic meter of ammonia water-ammonium bicarbonate solution; the total leaching time is 3 hours, the leaching temperature is 25-40° C. After solid-liquid separation, the obtained zinc-ammonium complexing solution contains 69.3 g, the leached rate of zinc from zinc oxide ore is 89.5%;

(2) Decarburization: after leaching step, adjust zinc oxide of said leached solution to 50 g/L, and then heat for decarburization according to the following procedures: add 30 kg of slaked lime to per cubic meter of leached solution, heat it 98° C. while stirring. When the concentration of CO$_3^{2-}$=0.29 mol/L, add 3 kg ammonium persulfate to per cubic meter of the above liquid, continue to stir for decarburization for 36 hour and oxidation reaction, and then separate it by filtration;

(3) Purification for impurity removal: add 2.08 g of potassium permanganate and stir for 0.5 hour meanwhile, add a small amount of polyacrylamide solution (4 mg/L), and then filter, obtain filtrate. Add sodium sulfide to said filtrate with the amount of 1.2 times of the theoretical amount of demanding for precipitation of Cu, Cd, Pb, the temperature is 70° C., stirring time is 2 hour, filter, add KMnO$_4$ to the filtrate with the amount of 2.7 times of the amount of Fe, the temperature is 80° C., stirring time is 1 hour (detection of Fe, Mn until they are qualified), filter, add zinc to the filtrate with the amount of 2.5 times of the theoretical amount for replacing Cu, Cd, Pb, stirring time is 30 min, the temperature is 60° C., filter;

(4) Refining: Add 1 kg of ammonium phosphate and 30 g of surfactant SDS to per cubic meter of liquid after purification for impurity removal, obtain refining solution;

(5) Ammonia evaporation and crystallization: Take said refining solution into ammonia evaporation equipment, the entrance steam pressure is 0.5 KMPa/cm$^2$, solution temperature is 105° C. Stop ammonia evaporation when [Zn$^{2+}$]=1.5 g/L, perform solid-liquid separation for the obtained emulsion, wash filter cake using water according to the ratio of liquid to solid 5:1, washing time is 1 hour, and then filter to obtain filter cake;

(6) Drying and calcinations: dry the filter cake at 105° C., obtain powder, calcine for 60 minutes in a muffle furnace at 280° C., sample and detect, obtain zinc oxide with the purity ZnO %=99.72%, the average particle diameter of nanometer prepared is 13.9 nm (XRD line width method), specific surface area is 107 m$^2$/g.

Embodiment 2

Raw material: 2$^\#$ zinc oxide ore, the ingredients: Zn of 9.67%, Fe of 19.33%, SiO of 26.63%, the phase composition of zinc is zinc carbonate of 12.28%, zinc silicate of 2.372%, zinc sulfide of 0.82%, zinc ferrites ore of 3.20%.

The method for producing high-purity zinc oxide:

(1) Leaching: take 500 g of said 1$^\#$ zinc oxide ore, prepare 1500 ml ammonia water-ammonium bicarbonate solution as leaching agent, of which, the concentration of NH$_3$ is 7 mol/L and the concentration of CO$_3^{2-}$ is 0.95 mol/L. Add 0.4 kg sodium fluorosilicate to per cubic meter of ammonia water-ammonium bicarbonate solution, add 0.03 kg of surfactant SDS to per cubic meter of ammonia water-ammonium bicarbonate solution, add 1 kg dicyandiamide to per cubic meter of ammonia water-ammonium bicarbonate solution; perform ball-milling while leaching, the leaching time in ball mill is 60 minutes, The material at ball mill outlet all through 140 mesh sieve, the total leaching time is 3 hours, the leaching temperature is 25-40° C. After solid-liquid separation, the obtained zinc-ammonium complexing solution contains 42.83 g, the leached rate of zinc from zinc oxide ore is 88.58%;

(2) Pre-evaporation ammonia: Heat the leached solution to 90° C. for ammonia evaporation. Add 4 kg of ammonium persulfate to per cubic meter of leached solution, and then perform ammonia evaporation until the ammonia concentration in the liquid is 2.5 mol/L;

(3) Decarburization: after the pre-evaporation ammonia, adjust zinc oxide of said leached solution to 60 g/L, and then heat for decarburization according to the following procedures: add 60 kg of slaked lime to per cubic meter of leached solution, heat it 90° C. while stirring. When the concentration of CO$_3^{2-}$=0.28 mol/L, add 3 kg ammonium persulfate to per cubic meter of the above liquid, continue to stir for decarburization and oxidation reaction. The time of decarburization lasts 38 hours, and then separate it by filtration; then add ammonium fluoride to the solution for calcium removal, the amount of ammonium fluoride is 1.5 times of theoretical value of Ca$^{2+}$ in the solution;

(4) Purification for impurity removal: add 1.28 g of potassium permanganate and stir for 0.5 hour meanwhile, add a small amount of polyacrylamide solution (4 m g/L), and then filter, obtain filtrate. Add sodium sulfide to said filtrate with the amount of 1.2 times of the theoretical amount of demanding for precipitation of Cu, Cd, Pb, the temperature is 70° C., stirring time is 2 hour, filter, add KMnO$_4$ to the filtrate with the amount of 3.5 times of the amount of Fe, the temperature is 80° C., stirring time is 1 hour (detection of Fe, Mn until they are qualified), filter, add zinc to the filtrate with the amount of 2.5 times of the theoretical amount for replacing Cu, Cd, Pb, stirring time is 30 min, the temperature is 60° C., filter;

(5) Refining: Add 3 kg of ammonium phosphate and 10 g of surfactant SDS to per cubic meter of liquid after purification for impurity removal;

(6) Ammonia evaporation and crystallization: take said refining solution into ammonia evaporation equipment, the entrance steam pressure is 0.6 KMPa/cm$^2$, solution temperature is 108° C. Detect the zinc content in the ammonia evaporation equipment, when the zinc content is 1%, add NaOH solution which mass percent is 30% with the amount of 3 L/m$^3$; stop ammonia evaporation when the mass percent of zinc ≤0.3%, obtain emulsion, perform solid-liquid separation for said emulsion, wash filter cake using water according to the ratio of liquid to solid 5:1, washing time is 1 hour, and then filter to obtain filter cake;

(7) Drying and calcinations: dry the filter cake at 105° C., obtain powder, calcine for 60 minutes in a muffle furnace at 250° C., sample and detect, obtain zinc oxide with the purity ZnO %=99.81%, the average particle diameter of nanometer prepared is 12.7 nm (XRD line width method), specific surface area is 112 m$^2$/g.

Embodiment 3

Raw material: 3$^\#$ zinc oxide ore, the ingredients: Zn of 13.6%, Fe of 18.67%, SiO of 27.83%, CaO of 29.92%, the phase composition of zinc is zinc carbonate of 7.96%, zinc silicate of 2.21%, zinc sulfide of 0.76%, zinc ferrites ore of 2.67%.

The method for producing high-purity zinc oxide:

(1) Leaching: take 1 ton of said 3$^\#$ zinc oxide ore, prepare 3000 L ammonia water-ammonium bicarbonate solution as leaching agent, of which, the concentration of NH$_3$ is 5.6 mol/L and the concentration of CO$_3^{2-}$ is 1.05 mol/L. Add 0.4 kg sodium fluorosilicate to per cubic meter of ammonia water-ammonium bicarbonate solution, add 0.05 kg of surfactant SDS to per cubic meter of ammonia water-ammonium bicarbonate solution, add 0.5 kg dicyandiamide to per cubic meter of ammonia water-ammonium bicarbonate solution; perform ball-milling while leaching, the leaching time in ball mill is 50 minutes, The material at ball mill outlet all through 140 mesh sieve, the total leaching time is 3.5 hours, the leaching temperature is 25-40° C., Add sodium fluorosilicate to the leaching agent. After solid-liquid separation, the obtained zinc-ammonium complexing solution contains 121.85 kg, the leached rate of zinc from zinc oxide ore is 89.59%;

(2) Pre-evaporation ammonia: Heat the leached solution to 98° C. for ammonia evaporation. Add 2 kg of ammonium persulfate to per cubic meter of leached solution, and then perform ammonia evaporation until the ammonia concentration in the liquid is 3.5 mol/L;

(3) Decarburization: after the pre-evaporation ammonia, adjust zinc oxide of said leached solution to 60 g/L, and then heat for decarburization according to the following procedures: add 60 kg of slaked lime to per cubic meter of leached solution, heat it 90° C. while stirring. When the concentration of CO$_3^{2-}$=0.28 mol/L, add 4 kg ammonium persulfate to per cubic meter of the above liquid, continue to stir for decarburization and oxidation reaction. The time of decarburization lasts 38 hours, and then separate it by filtration; then add ammonium fluoride to the solution for calcium removal, the amount of ammonium fluoride is 2.0 times of theoretical value of Ca$^{2+}$ in the solution;

(4) Purification for impurity removal: add 3.7 kg of potassium permanganate and stir for 0.8 hour meanwhile, add a small amount of polyacrylamide solution (4 mg/L), and then filter, obtain filtrate. Add sodium sulfide to said filtrate with the amount of 1.2 times of the theoretical amount of demanding for precipitation of Cu, Cd, Pb, the temperature is 70° C., stirring time is 2 hour, filter, add KMnO$_4$ to the filtrate with the amount of 3.5 times of the amount of Fe, the temperature is 80° C., stirring time is 1 hour (detection of Fe, Mn until they are qualified), filter, add zinc to the filtrate with the amount of 2.5 times of the theoretical amount for replacing Cu, Cd, Pb, stirring time is 30 min, the temperature is 60° C., filter;

(5) Refining: Add 2 kg of ammonium phosphate and 50 g of surfactant SDS to per cubic meter of liquid after purification for impurity removal;

(6) Ammonia evaporation and crystallization: take said refining solution into ammonia evaporation equipment, the entrance steam pressure is 0.8 KMPa/cm$^2$, solution temperature is 108° C. Detect the zinc content in the ammonia evaporation equipment, when the zinc content is 1.5%, add NaOH solution which mass percent is 30% with the amount of 5 L/m$^3$; stop ammonia evaporation when the mass percent of zinc ≤0.29%, obtain emulsion, perform solid-liquid separation for said emulsion, wash filter cake using water according to the ratio of liquid to solid 5:1, washing time is 1 hour, and then filter to obtain filter cake;

(7) Drying and calcinations: dry the filter cake at 105, obtain powder, calcine for 60 minutes in a muffle furnace at 250° C., sample and detect, obtain zinc oxide with the purity ZnO %=99.85%, the average particle diameter of nanometer prepared is 12.3 nm (XRD line width method), specific surface area is 116 m$^2$/g.

What is claimed is:

1. A method for producing a nanometer zinc oxide from low-grade zinc oxide ore by ammonia decarburization, comprising:

the low-grade zinc oxide ore being processed by leaching, purification for impurity removal, crystallization by ammonia evaporation, drying and calcinations, comprising:

taking ammonia water-ammonium bicarbonate solution as a leaching agent in said leaching step, wherein said ammonia water-ammonium bicarbonate solution includes the molar concentration c(NH$_3$)=5.5-7 mol/L and the molar concentration c(CO$_3^{2-}$)=0.95-1.2 mol/L, and 0.3-0.5 kg sodium fluorosilicate is added to per cubic meter of said leaching agent;

adjusting zinc oxide of said leached solution to 50-60 g/L, and then performing heating to reduce ammonia from said ammonia water-ammonium bicarbonate solution and decarburize said ammonia water-ammonium bicarbonate solution by natural precipitation, via the following steps: adding 30-60 kg slaked lime to per cubic meter of said leached solution and stirring said leached solution to produce a stirred solution, heating said stirred solution to 90-98° C. until c(CO$_3^{2-}$)≤0.3 mol/L, and c(NH3)≤3.5 mol/L, and then adding ammonium persulfate with the amount of 3-4 kg/m$^3$ and slaked lime powder with the amount of 5-10 kg/m$^3$ to produce a treated solution, stirring to decarburize said treated solution which is then subject to an oxidation reaction, detecting when the concentration of CO$_3^{2-}$ is ≤0.1 mol/L and removing iron and manganese from said treated solution to produce a new solution, and performing solid-liquid separation on said new solution;

performing refining treatment after purification for impurity removal by adding ammonium phosphate and surfactant to said new solution after purification to produce a refined solution, wherein the amount of ammonium phosphate is 1-3 kg per cubic meter of said new solution after purification, and the amount of surfactant is 10-50 g per cubic meter of said new solution after purification.

2. The method for producing high-purity nanometer zinc oxide according to claim 1, further comprising adding surfactant additionally with the amount of 0.03 kg~0.05 kg per cubic meter of said leaching agent of ammonia water-ammonium bicarbonate solution.

3. The method for producing high-purity nanometer zinc oxide according to claim 2, further comprising adding dicyandiamide additionally with the amount of 0.5 kg~1 kg per cubic meter of said leaching agent of ammonia water-ammonium bicarbonate solution.

4. The method for producing high-purity nanometer zinc oxide according to claim 1, wherein wet ball-milling leaching is adopted when leaching.

5. The method for producing high-purity nanometer zinc oxide according to claim 1, further comprising performing a pre-evaporation ammonia step including: heating the leached solution to 90-98° C. for ammonia evaporation, adding ammonium persulfate with the amount of 2-4 kg per cubic meter of leached solution, and evaporating the solution until the ammonia concentration is 2.5-3.5 mol/L.

6. The method for producing high-purity nanometer zinc oxide according to claim 1, wherein after decarburization step, ammonium fluoride is added to the solution with the amount of 1.5-2.0 times of the theoretical value of $Ca^{2+}$ in the solution.

7. The method for producing high-purity nanometer zinc oxide according to claim 1, further comprising detecting the zinc content of liquid in the ammonia evaporation equipment in said crystallization by ammonia evaporation step; and when the zinc content is detected to be 1-1.5%, adding NaOH solution to the ammonia evaporation equipment with the adding amount of 3-5 $L/m^3$, wherein the concentration of said NaOH solution is 30% calculating by mass percent, and completing the ammonia evaporation step when the mass percent of zinc is ≤0.3%.

8. The method for producing high-purity nanometer zinc oxide according to claim 1, wherein said low-grade zinc oxide ore is selected from the group consisting of smithsonite, zinc ferrites ore or hemimorphite with the zinc mass percent of 8%~30%, or mixed ore of those with the zinc mass percent of 8%~30%.

9. The method for producing high-purity nanometer zinc oxide according to claim 1, wherein said calcinations temperature is 150-280° C.

* * * * *